(12) United States Patent
Rapp

(10) Patent No.: US 9,310,228 B1
(45) Date of Patent: Apr. 12, 2016

(54) COMPRESSED AIR INDICATOR

(71) Applicant: James E. Rapp, Eagan, MN (US)

(72) Inventor: James E. Rapp, Eagan, MN (US)

( * ) Notice: Subject to any disclaimer, the term of this patent is extended or adjusted under 35 U.S.C. 154(b) by 0 days.

(21) Appl. No.: 14/750,565

(22) Filed: Jun. 25, 2015

Related U.S. Application Data

(63) Continuation-in-part of application No. 13/784,005, filed on Mar. 4, 2013, now abandoned.

(51) Int. Cl.
*G01L 7/16* (2006.01)
*G01L 19/10* (2006.01)
*G01L 19/12* (2006.01)
*G01D 7/00* (2006.01)

(52) U.S. Cl.
CPC ............... *G01D 7/005* (2013.01); *G01L 7/166* (2013.01); *G01L 19/10* (2013.01); *G01L 19/12* (2013.01)

(58) Field of Classification Search
CPC ............ G01L 7/00; G01L 7/16; G01L 7/163; G01L 7/166; G01L 19/10; G01L 19/12; B60C 23/04; B60C 23/0401; B60C 23/0405
USPC ......... 116/266, 268, 270, 272, 273, 275, 276, 116/34 A, 34 B, 34 R, DIG. 7; 73/146.8, 700, 73/709, 744
See application file for complete search history.

(56) References Cited

U.S. PATENT DOCUMENTS

| | | | | | |
|---|---|---|---|---|---|
| 1,334,874 A | * | 3/1920 | Bruninga | ................. | G01L 17/00 137/227 |
| 2,011,264 A | * | 8/1935 | Wagner | ..................... | G01L 7/16 73/47 |
| 2,662,502 A | * | 12/1953 | Turner | ................. | A62C 13/003 116/273 |
| 3,670,688 A | * | 6/1972 | Seaberg | ................... | G01L 17/00 116/34 R |
| 4,136,560 A | * | 1/1979 | Gellos | ................. | B60C 23/0496 73/146.8 |
| 4,901,747 A | * | 2/1990 | Yabor | ................. | B60C 23/0496 116/34 R |
| 4,986,128 A | * | 1/1991 | Burns | ..................... | G01L 19/12 116/272 |
| 5,351,562 A | * | 10/1994 | Scott | ..................... | F16F 9/0209 116/205 |
| 5,845,597 A | * | 12/1998 | Karpal | .................... | G01L 7/166 116/268 |
| 6,124,785 A | * | 9/2000 | Huang | ................ | B60C 23/0408 116/34 R |
| 6,164,139 A | * | 12/2000 | Krimmer | ................ | G01L 19/10 73/146.8 |
| 6,293,297 B1 | * | 9/2001 | Maldonado | ......... | B60C 23/0496 116/34 R |

(Continued)

FOREIGN PATENT DOCUMENTS

| | | | | |
|---|---|---|---|---|
| DE | 3839612 C1 | * | 2/1990 | ............. G01L 19/12 |
| FR | 2174048 A1 | * | 10/1973 | ................ G01L 7/16 |
| JP | 63295937 A | * | 12/1988 | ................ G01L 7/16 |

OTHER PUBLICATIONS

Tire Pressure Gauge. Product listing [online]. WinAccess L.T.D, 2012 [retrieved on Jul. 12, 2012]. Retrieved from the Internet: http://win-access.com/aecommerce/c10011/25344.php.

(Continued)

*Primary Examiner* — R. A. Smith
(74) *Attorney, Agent, or Firm* — Robert I. Montgomery; Montgomery Patent & Design

(57) ABSTRACT

A compressed air indicator includes a housing having a pair of fittings and at least one (1) external pressure status window. The housing allows an "in-line" connection to an air line allowing compressed air to pass through. Once connected, movable indicator sleeves within the housing are visible through any window. The indicator sleeves are acted upon and correspondingly positioned relative to each window based upon "pressure" or "no-pressure" conditions within the air line and the housing.

17 Claims, 3 Drawing Sheets

(56) References Cited

U.S. PATENT DOCUMENTS

| | | | |
|---|---|---|---|
| 7,493,808 B2* | 2/2009 | Milanovich | B60C 23/0496 116/34 R |
| 7,954,445 B2* | 6/2011 | Satoh | F16L 37/091 116/264 |
| 2002/0078754 A1* | 6/2002 | Chen | G01L 17/00 73/715 |
| 2004/0031324 A1* | 2/2004 | Cho | G01L 19/08 73/729.2 |

OTHER PUBLICATIONS

Tyre pressure alert cap (tyre pressure indicator, tyre pressure gauge, tyre, pressure detector). Product listing [online]. Cixi Bomi Trading Co., Ltd., 2012 [retrieved on Jul. 27, 2012]. Retrieved from the Internet: http://blueseaaquarium.en.alibaba.com/product/226965350200749116/tyre_pressure_alert_cap_tyre_pressure_indicator_tyre_pressure_gauge_tyre_pressure_detector_.html.

* cited by examiner

COMPRESSED AIR INDICATOR

RELATED APPLICATIONS

The present invention was first described in and claims the benefit of U.S. Non-Provisional application Ser. No. 13/784,005, the entire disclosures of which are incorporated herein by reference.

FIELD OF THE INVENTION

The present invention relates generally to gas pressure indicators, and in particular, to an in-line pressure indicator for compressed air lines.

BACKGROUND OF THE INVENTION

Air-operated tools, such as impact wrenches, cutting chisels, and the like, are common tools found in almost any mechanical shop, or motor vehicle repair center. Pneumatic power is also used to operate nail guns, pneumatic staplers, inflation devices, and other tools around homes and businesses. When such tools are connected to an air line, it is not intuitively obvious as to the presence of compressed air. The user must typically go ahead with the connection of the tool, and then try to operate the tool to determine proper air pressure. This results in much wasted time and possible repeated trips back and forth to the compressor just to begin work. Additionally, the lack of any indication may impact safety, should a user begin to work on a pneumatic piping system thinking it is unpressurized, when it is actually not.

Accordingly, there exists a need for a device which determines and indicates the presence of compressed air in a pneumatic system.

SUMMARY OF THE INVENTION

The inventor has recognized the aforementioned inherent problems and lack in the art and observed that there is a need for a device that can easily and quickly determine and indicate the presence of compressed air in a pneumatic system. The development of the present invention, which will be described in greater detail herein, substantially departs from conventional solutions to provide a compressed air indicator and in doing so fulfills this need.

In one (1) embodiment, the disclosed compressed gas indicating device can include a housing comprising a first and a second end and an outer wall defining a hollow interior, a dividing wall positioned within the hollow interior, the dividing wall defining an inner air chamber and an outer air chamber, the inner air chamber being pneumatically connected to the outer air chamber, a first indicator sleeve and a second indicator sleeve disposed within the outer air chamber, and at least one (1) window disposed within the outer wall, wherein both indicator sleeves are linearly movable such that the first indicator sleeve, in response to a presence of compressed gas within the inner chamber, is visible through any window, and the second indicator sleeve, in response to a lack of compressed gas within the inner chamber, is visible through any window.

In another embodiment, the disclosed compressed gas indicating device can include a housing comprising a first end and a second end cylindrical outer wall, defining a hollow interior, a cylindrical dividing wall positioned within the hollow interior, the dividing wall defining an inner air chamber and an outer air chamber, a plurality of weep apertures extending through the dividing wall from the inner chamber to the outer chamber, the weep apertures pneumatically connecting the inner chamber and the outer chamber, a first indicator sleeve and a second indicator sleeve disposed within the outer air chamber, and at least one (1) window disposed within the outer wall, wherein both indicator sleeves are linearly movable such that the first indicator sleeve, in response to a presence of compressed gas within the inner chamber, is visible through any window, and the second indicator sleeve, in response to a lack of compressed gas within the inner chamber, is visible through any window. This is accomplished with a seal being acted upon by the compressed gas such that the first indicator sleeve is visible through any window, and a spring biasing the second indicator sleeve such that it is visible through any window.

Furthermore, the described features and advantages of the disclosed compressed air indicator can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
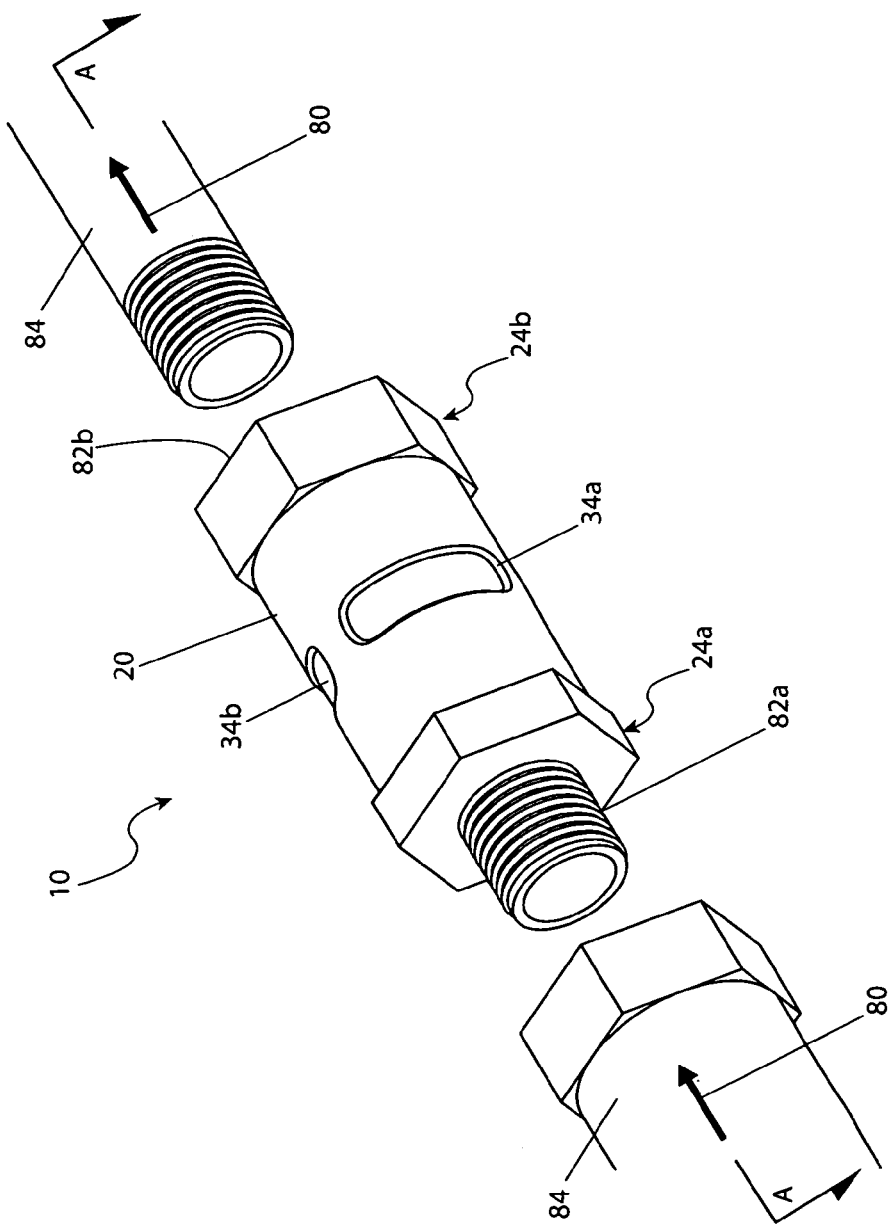
FIG. 1 is a perspective view of a compressed air indicator 10 in accordance with the present invention.

DESCRIPTIVE KEY 10 compressed air indicator
20 housing
21 outer wall
23 dividing wall
24a first end
24b second end
26 inner air chamber
28 outer air chamber
30 weep aperture
32 spring
34a first window
34b second window
40 indicator cylinder
42 seal
44 first indicator sleeve
46 second indicator sleeve
80 compressed flow of air
82a first fitting
82b second fitting
84 air line

DETAILED DESCRIPTION OF THE PREFERRED EMBODIMENT

In accordance with the invention, the best mode is presented in terms of the described embodiments, herein depicted within FIGS. 1 through 4. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Figure 4:
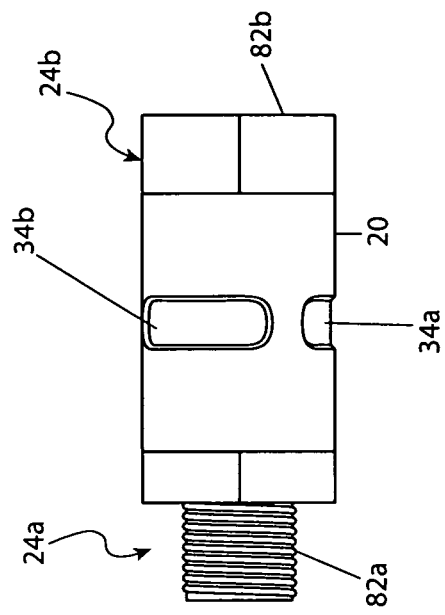
Figure 3:
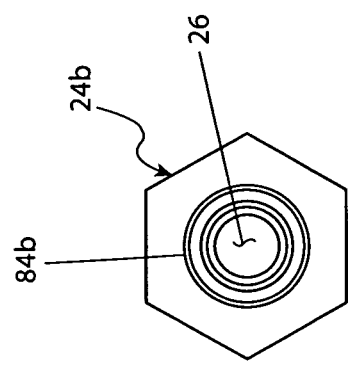
FIG. 3 is a side view of a second end 24b of the compressed air indicator 10 in accordance with the present invention; and, FIG. 4 is a side view of the compressed air indicator 10 in accordance with the present invention.

Referring now to FIGS. 1, 3, and 4, disclosing a compressed air indicator (herein referred to generally as a "device") 10, where like reference numerals represent similar or like parts. Generally, the device 10 indicates the presence or absence of compressed flow of air 80 within a pneumatic air line 84.

Referring now to FIG. 1, the device 10 can include a unitary cylindrical plastic or metallic housing 20 having a first window 34a and a second window 34b. The housing 20 can also be fabricated in multiple elements. A colored first indicator sleeve 44 is visible through either window 34a, 34b when a compressed flow of air 80 is present. The first indicator sleeve 44 can be a quickly recognizable color, preferably green. A second colored indicator sleeve 46 is visible through either status window 34a, 34b when no compressed flow of air 80 is present. The second indicator sleeve 46 can be a quickly recognizable color, preferably red, and different than the color of the first indicator sleeve 44.

Figure 2:
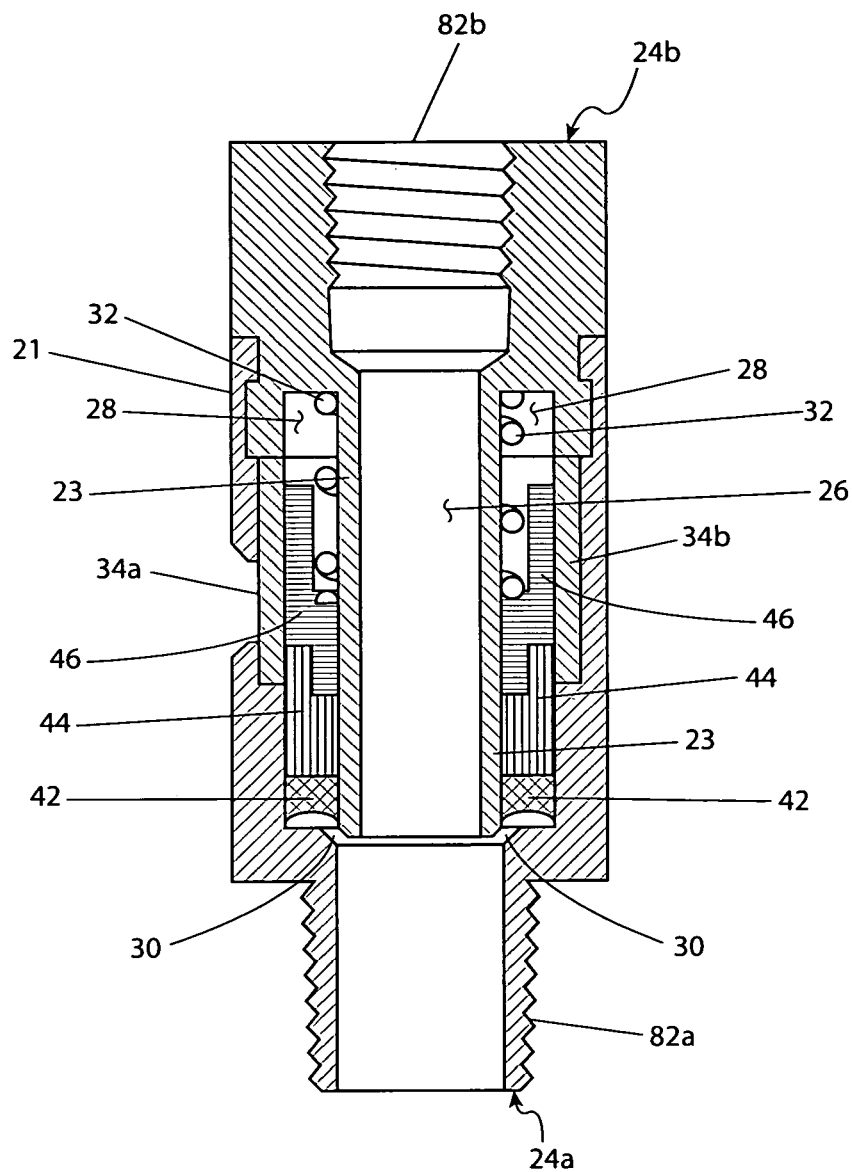
FIG. 2 is a sectional view of the compressed air indicator 10 taken along section line A-A of FIG. 1.

Referring now to FIG. 2, the housing 20 includes a cylindrical outer wall 21, a circumscribed internal dividing wall 23, separating a hollow inner air chamber 26 from an outer air chamber 28. The pressurized (i.e., compressed) flow of air 80 flows through the inner air chamber 26. A gap is formed between the outer wall 21 and the circumscribed dividing wall 23 that defines the outer air chamber 28. The first indicator sleeve 44 and the second indicator sleeve 46 each reside within the outer air chamber 26. The first indicator sleeve 44 and second indicator sleeve 46 are keyed together, or otherwise configured to interact with each other, such that movement of the first indicator sleeve 44 actuates movement of the second indicator sleeve 46, and vice versa, linearly within the outer air chamber 28 based upon the presence (i.e., pressure) of the compressed flow of air 80.

The housing 20 includes a first end 24a and a second end 24b and forms a closed pressure-bearing vessel. The first end 24a includes a first fitting 82a and the second end 24b includes a second fitting 82b, each providing for a plumbing connection between the device 10 to an air line 84 in an "in-line" manner. In a preferred embodiment, the air fittings 82a, 82b can be conventional threaded tubing fittings, as shown in the FIGS. However, it can be appreciated that a variety models of the device 10 can be provided, each having specially configured ends 24a, 24b being configured to allow connection to various types of air lines 84, such as hard plumbing, plastic tubing, soldered copper pipe, various female and male threaded fittings and piping, and the like, without deviating from the teachings of the present disclosure, and as such should not be interpreted as a limiting factor. It is preferred that the first fitting 82a is a male compression fitting and the second fitting 82b is a female compression fitting.

An integral circular seal 42 is disposed around an entire bottom edge of the outer air chamber 28, adjacent to the first end 24a. The seal 42 is preferably a U-cup seal of 0.125 inch in thickness, made of Buna-N and available from MSP Seals, Inc. The seal 42 is acted upon by a supply of compressed flow of air 80 being continuously introduced into the outer air chamber 28 through a plurality of weep apertures 30. The weep apertures 30 can be disposed through the dividing wall 23 to pneumatically connect the inner air chamber 26 and the outer air chamber 28, preferably toward or near the lower closure 24b. In a preferred embodiment, two (2) weep apertures 30 are located at diametrically opposing positions subjacent from a bottom edge of the dividing wall 23. Thus, the compressed flow of air 80 can transfer between the inner air chamber 26 and the outer air chamber 28.

The first indicator sleeve 44 and the second indicator sleeve 46 can be adjacently positioned within the outer air chamber 26. Preferably, the indicator sleeves 44, 46 are positioned at an intermediate position within the outer air chamber 26. The first indicator sleeve 44 and the second indicator sleeve 46 can preferably be of different colors, such as green and red, respectively, to indicate a "pressure" or a "no-pressure" status of the device 10. Other indicia may be used to positively indicate the sensed pressure of the flow of air 84.

A compression spring 32 can be positioned within the outer air chamber 28 between the second end 24b and a top surface of the second indicator sleeve 46. The spring 32 is preferably a stainless steel construction of 0.500 inch in length and 0.045 inch in diameter. The spring 32 biases the second indicator sleeve 46 towards the first end 24a when no compressed flow of air 80 is present. This enables the second indicator sleeve 46 to be visible through either window 34a, 34b and functions to provide a return function during a loss of air pressure event.

Each window 34a, 34b can include a generally oval- or rectangle-shaped opening molded or machined within the outer wall 21 of the housing 20 to provide an external view of the position of either indicator sleeve 44, 46. The spring 32 biases the second indicator ring 46 to be visible through the status window 34 when no compressed flow of air 80 is present. When a compressed flow of air 80 is present within the air line 84, the compressed flow of air 80 passes through the weep apertures 30. The compressed flow of air 80 within the outer air chamber 28 acts upon the seal 42 and forces it toward the second end 24b, along with the first indicator sleeve 44, the second indicator sleeve 46, and spring 32, thereby compressing the spring 32 to align the first indicator sleeve 44 with either window 34a, 34b to visually communicate a "pressure" condition.

During a loss of air pressure, the spring 32 biases the second indicator sleeve 46, first indicator sleeve 44, and seal 42 towards the first end 24a, thereby aligning the second indicator sleeve 46 with either window 34a, 34b to communicating a "no-pressure" condition. The position of the colored sleeves 44, 46 is clearly visible through either window 34a, 34b on the exterior of the device 10.

It is envisioned that other styles and configurations of the disclosed device 10 can be easily incorporated into the teachings of the present disclosure, and only certain particular configurations have been shown and described for purposes of clarity and disclosure and not by way of limitation of scope.

The disclosed device 10 can be installed and utilized by the user in a simple and effortless manner with little or no training After initial purchase or acquisition of the system 10, it can be installed and utilized as indicated in FIGS. 1-2.

The method of utilizing the device 10 may be achieved by performing the following steps: procuring a model of the device 10 being configured with suitable fittings to allow integration into a particular type of air line 84 such as hose, steel pipe, or the like; using conventional plumbing assembly methods, installing the device 10 in an "in-line" manner into the air line 84; visually displaying a "pressure" condition by supplying a compressed flow of air 80 to the air line 84 and observing the appearance of the first indicator sleeve 44 in either window 34a, 34b; and visually displaying a "no-pressure" condition by removing or venting the compressed flow of air 80 from the air line 84 and observing the appearance of the second indicator sleeve 46 in either status window 34a, 34b.

The foregoing embodiments of the disclosed compresses air indicator have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments of the disclosed baluster bracket assembly shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. A compressed gas indicating device comprising:
   a housing comprising an outer wall, a first end, and a longitudinally opposed second end defining a hollow interior;
   a dividing wall positioned within said hollow interior, said dividing wall defining an inner air chamber and an outer air chamber, said inner air chamber being pneumatically connected to said outer air chamber;
   a first indicator sleeve disposed within said outer air chamber, proximate said first end;
   a second indicator sleeve disposed within said outer chamber and operably abutting said first indicator sleeve proximate said second end;
   a spring located within said outer air chamber and positioned between an upper surface of said second indicator sleeve and said second end; and,
   at least one window disposed within said outer wall;
   wherein said spring biases said second indicator sleeve and said first indicator sleeve towards said first end; and,
   wherein said first and second indicator sleeves are linearly movable such that said first indicator sleeve, in response to a presence of compressed gas within said inner chamber, is positioned to be visible through any one of said at least one window, and said second indicator sleeve, in response to a lack of compressed gas within said inner chamber, is positioned to be visible through any one of said at least one window.

2. The device of claim 1, wherein said dividing wall comprises at least one weep aperture extending from said inner chamber to said outer chamber, said weep aperture transfers at least a portion of said compressed gas from said inner chamber to said outer chamber.

3. The device of claim 2, wherein said first indicator sleeve comprises a lower perimeter edge abutting a seal disposed on a bottom wall of said outer chamber proximate said first end, and,
   wherein said seal is positioned to be acted upon by said compressed gas passing through each weep aperture.

4. The device of claim 3, wherein said at least one weep aperture further comprises a pair of weep apertures located at diametrically opposing positions.

5. The device of claim 1, wherein said spring is a coiled compression spring disposed about a circumference of said dividing wall.

6. The device of claim 1, wherein said first indicator sleeve comprises a first color.

7. The device of claim 6, wherein said second indicator sleeve comprises a second color.

8. The device of claim 7, wherein said first color and said second color are different.

9. The device of claim 1, further comprising a first air fitting attached to said first end for connection of an inlet supply line of said compressed gas and a second fitting attached to said second end for connection to an outlet supply line of said compressed gas.

10. A compressed gas indicating device comprising:
   a housing comprising a cylindrical outer wall, a first end, and a longitudinally opposed second end defining a hollow interior;
   a cylindrical dividing wall positioned within said hollow interior, said dividing wall defining an inner air chamber and an outer air chamber;
   a plurality of weep apertures extending through said dividing wall from said inner chamber to said outer chamber, said weep apertures pneumatically connecting said inner chamber and said outer chamber;
   a first indicator sleeve disposed within said outer air chamber, proximate said first end;
   a second indicator sleeve disposed within said outer chamber and operably abutting said first indicator sleeve proximate said second end;
   a spring located within said outer air chamber and positioned between an upper surface of said second indicator sleeve and said second end; and,
   at least one window disposed within said outer wall;
   wherein said spring biases said second indicator sleeve and said first indicator sleeve towards said first end; and,
   wherein said first and second indicator sleeves are linearly movable such that said first indicator sleeve, in response to a presence of compressed gas within said inner chamber, is positioned to be visible through any one of said at least one window, and said second indicator sleeve, in response to a lack of compressed gas within said inner chamber, is positioned to be visible through any one of said at least one window.

11. The device of claim 10, wherein said first indicator sleeve comprises a lower perimeter edge abutting a seal disposed on a bottom wall of said outer chamber proximate said first end, and, wherein said seal is positioned to be acted upon by said compressed gas passing through each weep aperture.

12. The device of claim 11, wherein said plurality of weep apertures further comprises a pair of weep apertures located at diametrically opposing positions.

13. The device of claim 10, wherein said spring is a coiled compression spring disposed around said dividing wall.

14. The device of claim 10, wherein said first indicator sleeve comprises a first color.

15. The device of claim 14, wherein said second indicator sleeve comprises a second color.

16. The device of claim 15, wherein said first color and said second color are different.

17. The device of claim 16, further comprising a first air fitting attached to said first end for connection of an inlet supply line of said compressed gas and a second fitting attached to said second end for connection to an outlet supply line of said compressed gas.

\* \* \* \* \*